United States Patent Office 3,340,276
Patented Sept. 5, 1967

3,340,276
3,4-DIPHENYL-CHROMANS
Richard William James Carney, Murray Hill, and William Laszlo Bencze, New Providence, N.J., assignors to Ciba Corporation, New York, N.Y., a corporation of Delaware
No Drawing. Filed Apr. 1, 1964, Ser. No. 356,667
9 Claims. (Cl. 260—345.2)

ABSTRACT OF THE DISCLOSURE

Compounds of the formula

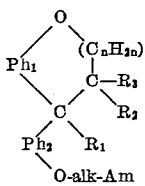

$Ph_1$=a 1,2-phenylene
$Ph_2$=a phenylene
$R_{1,2}$=H, alkyl
$R_3$=a phenyl
alk=lower alkylene
Am=tert. amino
n=0–2

N-oxides, quaternaries and acid addition salts thereof, e.g., the 2-(4-chloro-phenyl)-4-[4-(2-diethylaminoethoxy) phenyl]-chroman, exhibit estrogenic and antifertility effects.

---

The present invention concerns basic ethers. More particularly, it relates to compounds having the formula:

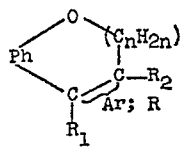

in which Ph is a 1,2-phenylene radical, Ar is a monocyclic carbocyclic aryl group substituted by tertiary amino-lower alkyl-oxy, in which tertiary amino is separated from oxy by at least two carbon atoms, R is an aryl radical, each of the groups $R_1$ and $R_2$ is hydrogen or lower alkyl, and in the group of the formula $—(C_nH_{2n})—$, which separates the oxygen from the carbon atom substituted by $R_2$ by at most two carbon atoms, the letter $n$ is an integer from 0 to 4, salts, N-oxides, salts of N-oxides or quaternary ammonium compounds thereof, as well as procedure for the preparation of such compounds.

The 1,2-phenylene (o-phenylene) radical is unsubstituted or may be substituted by one or more than one of the same or of different substituents attached to any of the four positions available for substitution. Substituents are primarily lower alkyl, e.g., methyl, ethyl, n-propyl, isopropyl and the like, etherified hydroxyl, especially lower alkoxy, e.g., methoxy, ethoxy, n-propyloxy, isopropyloxy, n-butyloxy and the like, as well as lower alkenyloxy, e.g., allyloxy and the like, or lower alkylenedioxy, e.g., methylenedioxy and the like, or esterified hydroxyl, particularly halogeno (representing hydroxyl esterified by a hydrohalic acid), e.g., fluoro, chloro, bromo and the like, as well as nitro, amino, or N-substituted amino, such as N,N-di-lower alkylamino, e.g., N,N-dimethylamino, N,N-diethylamino and the like, trifluoromethyl, acyl, such as lower alkanoyl, e.g., acetyl, propionyl, pivalyl and the like, benzoyl, pyridoyl, e.g., nicotinoyl and the like, or any other suitable substituent. The 1,2-phenylene group Ph in the above formula is primarily 1,2-phenylene (lower alkyl)-1,2-phenylene, (etherified hydroxy)-1,2-phenylene, especially (lower alkoxy)-1,2-phenylene, as well as (lower alkenyloxy)-1,2-phenylene or (lower alkylenedioxy)-1,2-phenylene and the like, or (esterified hydroxy)-1,2-phenylene, particularly (halogeno)-1,2-phenylene and the like, as well as (nitro)-1,2-phenylene,(amino)-1,2-phenylene, (N-substituted amino)-1,2-phenylene, such as (N,N-di-lower alkyl-amino)-1,2-phenylene and the like, (trifluoromethyl)-1,2-phenylene, (acyl)-1,2-phenylene, such as (lower alkanoyl)-1,2-phenylene, (benzoyl)-1,2-phenylene, (pyridoyl)-1,2-phenylene and the like, or any other suitably substituted 1,2-phenylene group.

A tertiary amino-lower alkyl-oxy-substituted monocyclic carbocyclic aryl group Ar has one or more than one tertiary amino-lower alkyl-oxy substituents, which may substitute any of the positions available for substitution; preferably, a tertiary amino-lower alkyl-oxy group substitutes the 4-position. Such substituent is represented by the group of the formula $—O—(C_mH_{2m})—Am$, in which the portion of the formula $—(C_mH_{2m})—$ stands for lower alkylene, having preferably from two to seven carbon atoms (i.e., the letter $m$ is preferably an integer from two to seven, both inclusive), and separates the tertiary amino group Am from the oxygen atom by at least two carbon atoms. The group of the formula $—(C_mH_{2m})—$ stands preferably for alkylene having from two to three carbon atoms (i.e., the letter $m$ stands primarily for an integer from two to three) and separates the tertiary amino group Am from the oxygen atom by two to three carbon atoms. Such alkylene group is above all 1,2-ethylene, as well as 1-methyl-1,2-ethylene, 2-methyl-1,2-ethylene or 1,3-propylene, but may also be 1,3-butylene, 2,3-butylene, 3,4-butylene, 1,4-butylene, 1,4-pentylene, 1,5-pentylene, 1,5-hexylene, 1,6-hexylene, 1,7-heptylene and the like.

A tertiary amino group such as the group Am in the above formula, is, for example, N,N-di-substituted amino, in which each of the substituents having preferably from one to ten carbon atoms, is, for example, an aliphatic radical, especially lower alkyl, e.g., methyl, ethyl, propyl, isopropyl butyl isobutyl secondary butyl, pentyl, neopentyl and the like, as well as lower alkenyl, e.g., allyl, 2-methylallyl and the like, a cycloaliphatic radical, such as cycloalkyl having from three to seven, preferably five or six, ring carbon atoms, e.g., cyclopentyl, cyclohexyl and the like, a cycloaliphatic-aliphatic radical, such as cycloalkyl-lower alkyl, in which cycloalkyl has from three to seven, preferably five or six, ring carbon atoms, e.g., cyclopentyl-methyl, 2-cyclohexylethyl and the like, a carbocyclic aryl radical, such as monocyclic carbocyclic aryl, e.g., phenyl and the like, a carbocyclic aryl-aliphatic radical, such as monocyclic carbocyclic aryl-lower alkyl, for example, phenyl-lower alkyl, e.g., benzyl, 1-phenylethyl, 2-phenylethyl and the like, or any other equivalent radical.

N,N-di-substituted amino groups representing the tertiary amino group Am are primary N,N-di-lower alkyl-amino, e.g., N,N-dimethylamino, N-methyl-N-ethylamino, N,N-diethylamino, N,N-di-n-propylamino, N,N-di-isopropylamino, N,N-di-n-butylamino and the like, as well as N-cycloalkyl-N-lower alkyl-amino, e.g., N-cyclopentyl-N-methyl-amino, N-cyclohexyl-N-methyl-amino, N-cyclohexyl-N-ethyl-amino and the like, or N-lower alkyl-N-phenyl-lower alkyl-amino, e.g., N-benzyl-N-methyl-amino, N-benzyl-N-ethyl-amino, N-ethyl-N-(1-phenylethyl)-amino, N-methyl-N-(2-phenylethyl)-amino and the like, or any other equivalent N,N-di-substituted amino group.

The above substituents, particularly lower alkyl, may also carry functional groups, such as hydroxyl, lower alkoxy, e.g., methoxy, ethoxy and the like, lower alkylmercapto, e.g., methylmercapto, ethylmercapto and the like, or any other suitable functional group. N,N-di-substituted-amino groups, in which the substituents carry functional groups, are, for example, N-hydroxy-lower alkyl-N-lower alkyl-amino, in which hydroxyl is separated from the amino-nitrogen by at least two, preferably by two to three, carbon atoms, e.g., N-(2-hydroxyethyl)-N-methyl-amino and the like, N,N-di-hydroxy-lower alkyl-amino, in which hydroxyl is separated from the amino-nitrogen by at least two, preferably by two to three, carbon atoms, e.g., N,N-di-(2-hydroxyethyl)-amino and the like.

The tertiary amino group, such as the group Am in the above formula, may also represent an N,N-disubstituted amino group, in which the two substituents are taken together and form a divalent radical, such as a 1-N,N-alkylene-imino group, in which alkylene has from four to eight carbon atoms, such as a 1-pyrrolidino group, e.g. 1-pyrrolidino, 2-methyl - 1 - pyrrolidino and the like, a 1-piperidino group, e.g. 1 - piperidino, 2 - methyl-1-piperidino, 4 - methyl - 1 - piperidino, 3 - hydroxy-1-piperidino, 3 - acetoxy - 1 - piperidino, 3 - hydroxymethyl-1-piperidino and the like, 1-N,N - (1,6 - hexylene)-imino, 1,N,N - (1,7 - heptylene)-imino and the like, a 1-N,N-aza-alkylene-imino group, in which alkylene has from four to six carbon atoms, and the two nitrogen atoms are separated by at least two carbon atoms, particularly a 1-N,N - (N - lower alkyl-aza-alkylene)-imino group, in which alkylene has from four to six carbon atoms, and the two nitrogen atoms are separated by at least two carbon atoms, such as 1-piperazino or, particularly, 4-lower alkyl - 1 - piperazino, e.g. 4-methyl-1-piperazino, 4-ethyl - 1 - piperazino and the like, as well as 4-hydroxyethyl - 1 - piperazino, 4 - acetoxyethyl-1-piperazino and the like, a 1-N,N - (3-aza-1,6-hexylene)-imino group, particularly a 1-N,N - (3-aza-3-lower alkyl-1,6-hexylene) imino group, e.g. 1-N,N - (3-aza-3-methyl-1,6-hexylene) imino and the like, or a 1-N,N - (4-aza-1,7-heptylene) imino group, particularly a 1-N,N - (4-aza - 4 - lower alkyl-1,7-heptylene)-imino group, e.g. 1-N,N - (4 - azo-4-methyl - 1,7 - heptylene)-imino and the like, or a 1-N,N-oxa-alkylene group, in which alkylene has preferably four carbon atoms, and the oxygen atom is separated from the nitrogen atom by two carbon atoms, such as a 4-morpholino group, e.g. 4 - morpholino, 3-methyl - 4-morpholino and the like, or a 1-N,N-thia-alkylene-imino group, in which alkylene has preferably four carbon atoms, and the sulfur atom is separated from the nitrogen by two carbon atoms, such as a 4-thiamorpholino group, e.g. 4-thiamorpholino and the like, or any other equivalent N,N-disubstituted amino group.

In the tertiary amino-lower alkyl-oxy group, the lower alkyl portion, either partially or in toto, may form part of a saturated heterocyclic ring system, the teritary amino group Am being a ring member and being separated from the oxy group by at least two carbon atoms. Such teritary amino-lower alkyl groups are for example, 1-methyl-2-piperidinomethyl, 1 - methyl - 3 - piperidino-methyl, 1-ethyl-4-piperidino, 1-methyl - 3 - pyrrolidinomethyl and the like.

Apart from being substituted by tertiary amino-lower alkyl-oxy, the monocyclic carbocyclic aryl group Ar may have one or more than one additional substituent, which may be attached to any of the positions available for substitution. Such substituents are lower alkyl, halogeno, or trifluoromethyl, such as one of those substituting the 1,2-phenylene group Ph. As mentioned above, the tertiary amino-lower alkyl-oxy-substituted group Ar may have more than one tertiary amino-lower alkyl-oxy group of the formula —O—$(C_mH_{2m})$—Am, in which Am and the group of the formula —$(C_mH_{2m})$— have the previously-given meaning.

The aryl group R is a carbocyclic aryl radical, particularly monocyclic carbocyclic aryl, e.g. phenyl or substituted phenyl, in which one or more than one of the same or of different substituents, represented, for example, by those substituting the 1,2-phenylene radical or by tertiary amino-lower alkyl-oxy, may be attached to any of the positions available for substitution. Substituted phenyl groups representing R are primarily (lower alkyl)-phenyl, (etherified hydroxy)-phenyl, especially (lower alkoxy)-phenyl, as well as (lower alkenyloxy) phenyl, (lower alkylenedioxy)-phenyl and the like, or (esterfied hydroxy)-phenyl, especially (halogeno)-phenyl, and the like, as well as (nitro)-phenyl, (amino)-phenyl, (N,N-di-lower alkylamino)-phenyl and the like, (trifluoromethyl) - phenyl, (acyl)-phenyl, such as (lower alkanoyl)-phenyl, (benzoyl) - phenyl, (pyridoyl)-phenyl and the like, as well as [Am—$(C_mH_{2m})$—O—]-phenyl, in which Am and the group —$(C_mH_{2m})$— have the previously-given meaning. The aryl radical representing R may also be a heterocyclic aryl group, particularly monocyclic heterocyclic aryl, such as pyridyl, e.g. 3-pyridyl, 4-pyridyl and the like.

Each of the groups $R_1$ and $R_2$ is primarily hydrogen, but may also represent lower alkyl, especially methyl, as well as ethyl, n-propyl, isopropyl, n-butyl and the like.

The group of the formula —$(C_nH_{2n})$—, in which the letter $n$ is an integer from 0 to 4, is either a direct bond between the oxygen and the carbon substituted by $R_2$, or a lower alkylene radical separating the oxygen from that carbon atom by at most two carbon atoms. Such lower alkylene radical is above all methylene, as well as 1,2-ethylene, but may also be 1,1-ethylene, 1-methyl-1,2-ethylene, 1,1-propylene, 1,1-butylene, 1,1-isobutylene and the like. The compounds of this invention have, therefore, the 2,3-dihydro benzofuran (or coumaran) ring system, the chroman ring system or the 2,3,4,5 - tetrahydro-1-benzoxepin (or homochroman) ring system.

Salts of the compounds of this invention are acid addition salts, such as pharmaceutically acceptable acid addition salts with inorganic acids, e.g. hydrochloric, hydrobromic, sulfuric, phosphoric acids and the like, or organic acids, such as organic carboxylic acids, e.g. acetic, propionic, pivalic, glycolic, lactic, malonic, succinic, maleic, hydroxy-maleic, malic, tartaric, citric, benzoic, salicylic, 2-acetoxybenzoic, nicotinic, isonicotinic acid and the like, or organic sulfonic acids, e.g. methane sulfonic, ethane sulfonic, ethane 1,2 - disulfonic, 2-hydroxyethane sulfonic, p-toluene sulfonic, naphthalene 2-sulfonic acid and the like. Other addition salts with acids may be useful as intermediates, for example, in the preparation of pharmaceutically acceptable acid addition salts or in the purification of the free compounds, as well as for identification or characterization purposes. Salts, which are prepared primarily for the latter, are, for example, those with certain inorganic acids, e.g. perchloric acid and the like, with acidic organic nitro compounds, e.g. picric, picrolonic, flavianic acid and the like, or with metal complex acid, e.g. phosphotungstic, phosphomolybdic chloroplatinic, Reinecke acid and the like. Mono- or poly-salts may be formed depending on the number of salt-forming groups and/or the conditions used for the salt formation.

Also included within the scope of the present invention are the N-oxides of the aforementioned compounds, as well as the acid addition salts of such N-oxides, for example, the pharmaceutically acceptable, non-toxic acid addition salts of N-oxides, such as those with the above-mentioned acids.

Quaternary ammonium derivatives of the compounds of this invention are those formed with reactive esters of alcohols and strong inorganic or organic acids, particularly those with lower aliphatic halides, sulfates, or organic sulfonates, such as lower alkyl halides, e.g. methyl, ethyl, n-propyl or isopropyl chloride, bromide, iodide and the like, di-lower alkyl sulfates, e.g. di-methyl sulfate, diethyl sulfate and the like, lower alkyl lower alkane sulfonates, e.g. ethyl or methyl methane sulfonate, ethane sulfonate and the like, lower alkyl lower hydroxy-alkane sulfonates, e.g. methyl 2-hydroxy-ethane sulfonate and the like, or lower alkyl monocyclic carbocyclic aryl sulfonates, e.g. methyl p-toluene sulfonate, ethyl p-toluene sulfonate and the like, as well as those with carbocyclic arylaliphatic halides, such as phenyl-lower alkyl halides, e.g. benzyl, 1-phenylethyl or 2-phenylethyl chloride, bromide or iodide and the like. Also included as quaternary ammonium compounds are the corresponding quaternary ammonium hydroxides, and the quaternary ammonium salts with acids other than hydrohalic, sulfuric or organic sulfonic acids, particularly those with the organic carboxylic acids mentioned hereinabove.

The compounds of this invention have estrogenic properties, and are, therefore, useful in lieu of other estrogenic agents, e.g. estradiol, stilbestrol, hexestrol and the like, for example, in the treatment of animals to increase weight gain, efficiency of feed utilization and the like.

Furthermore, it has also been found that, when given to female rats, the compounds of this invention inhibit pregnancy; they are, therefore, useful as antifertility agents to prevent pregnancy.

In addition, compounds of this invention have antimicrobial effects, such as antifungal properties, for example, against fungi causing superficial dermatophytoses, such as *Trichophyton mentagrophytes, Trichophyton gallinae, Trichophyton interdigitale, Microsporum audouini, Microsporum canis, Microsporum gypseum* and the like, fungi causing chronic infections of the skin and the subcutaneous tissue, such as *Sporotrichium schenkii* and the like, or fungi causing deep-seated systemic mycoses (yeasts), such as *Candida albicans, Cryptococcus neoformans, Histoplasma capsulatum* and the like, effects against actinomyces, such as *Nocardia asteroides* and the like, against bacteria, such as gram-positive bacteria, for example, *Diplococcus pneumoniae, Staphylococcus aureus* and the like, or gram-negative bacteria, for example, *Escherichia coli, Pseudomonas aeruginosa* and the like. Such compounds are, therefore, useful in the treatment of microbial infections caused, for example, by such fungi, actinomyces, bacteria and protozoa of the above type.

Compounds of this invention, especially those with more than one tertiary amino-lower alkoxy group substituting Ar, have taeniacidal (anti-tapeworm) properties, and are, therefore, useful as taeniacides in the treatment of tapeworm infections, caused, for example, by *Hymenolepas nana, Dypilidium canium, Taenia pisiformis* and the like.

Particularly useful are the compounds having the following formula:

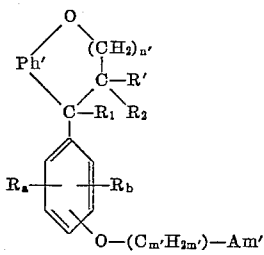

in which Ph' stands primarily for 1,2-phenylene, (lower alkyl)-1,2-phenylene, (lower alkoxy)-1,2-phenylene, or (halogeno)-1,2-phenylene, R' is phenyl, (lower alkyl)-phenyl, (lower alkoxy)-phenyl or (halogeno)-phenyl, each of the groups $R_1$ and $R_2$ is hydrogen or lower alkyl, the letter $n'$ stands for one of the integers from 0 to 2, particularly for 1, Am' stands for N,N-di-lower alkylamino, N,N-alkylene-imino, in which alkylene has preferably from four to seven carbon atoms, 4-morpholino or 4-lower alkyl-1-piperazino, the group of the formula —$(C_{m'}H_{2m'})$— stands for alkylene having from two to three, preferably two, carbon atoms (i.e. the letter $m'$ stands for one of the integers 2 and 3, preferably for the integer 2), and separates the group Am' from the oxygen atom by two to three, preferably by two, carbon atoms, and each of the groups $R_a$ and $R_b$ is hydrogen, halogeno, especially chloro, or the group of the formula $$-O-(C_{m'}H_{2m'})-Am'$$

in which Am' and the group of the formula $$-(C_{m'}H_{2m'})-$$

have the previously-given meaning, and the acid addition salts, particularly the pharmaceutically acceptable acid addition salts, thereof. In the above compounds, the group of the formula —O—$(C_{m'}H_{2m'})$—Am' preferably substitutes the 4-position of the phenyl portion.

The above group of compounds is represented by those of the following formula:

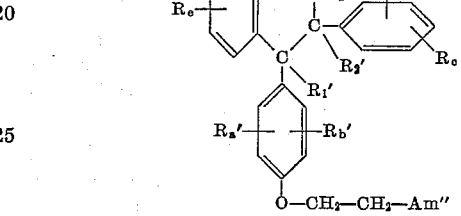

in which Am" is N,N-di-lower alkyl-amino or N,N-alkylene-imino, in which alkylene has from four to seven carbon atoms, one of the groups $R_1'$ and $R_2'$ is hydrogen or lower alkyl, and the other is hydrogen, each of the groups $R_a'$ and $R_b'$ is hydrogen or the group of the formula —O—$CH_2CH_2$—Am", in which Am" has the previously-given meaning, and each of the groups $R_c$, $R_d$ and $R_e$ is hydrogen, lower alkyl, lower alkoxy or halogeno, or acid addition salts, particularly pharmaceutically acceptable acid addition salts, thereof.

The compounds of this invention are useful in the form of compositions suitable for enteral, e.g. oral, parenteral or topical use; essentially, they comprise a pharmacologically effective amount of one of the new compounds of this invention in admixture with a pharmaceutically acceptable, organic or inorganic, solid or liquid carrier, which usually represents the major portion by weight of such compositions. These preparations are in solid form, for example, as capsules, tablets, dragees and the like, in liquid form, for example, as solutions, suspensions and the like, or in the form of emulsions, e.g. salves, creams and the like. Suitable carrier materials, are, for example, starches, e.g. corn starch, wheat starch, rice starch and the like, sugars, e.g. lactose, glucose, sucrose and the like, stearic acid or salts thereof, e.g. magnesium stearate, calcium stearate and the like, stearyl alcohol, talc, gums, acacia, tragacanth, polyalkylene glycols, propylene glycol and the like. The quantity and the nature of the carrier ingredients can vary widely and depend, inter alia, upon the desired physical appearance or size of the composition, method of manufacture and the like. Encapsulation may be effected by using, if desired, the same excipients as those for tablets. If necessary, the compositions may contain other auxiliary substances, such as preserving, stabilizing, wetting, emulsifying agents and the like, salts for varying the osmotic pressure, buffers, etc. They may also contain, in combination, other pharmacologically useful substances. The compounding of the formulations is generally carried out in the manner normally employed in the art, i.e. by manufacturing a mixture, a granulate and the like. Any compatible color, approved and certified under the provisions of the Federal Food, Drug and Cosmetic law may be used for aesthetic purposes or as a means of identification.

The compounds of the present invention are prepared according to methods known per se; for example, they are formed by converting in a compound of the formula:

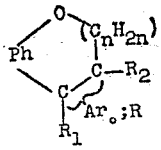

in which Ph, R, $R_1$, $R_2$ and the letter $n$ have the previously-given meaning, and $Ar_\circ$ is a monocycvlic carbocyclic aryl group substituted by $R_\circ$ capable of being converted into tertiary amino-lower alkoxy, in which tertiary amino is separated from the oxygen by at least two carbon atoms, or a salt thereof, in the form of mixtures of isomers or single isomers, the monocyclic carbocyclic aryl group $Ar_\circ$ substituted by $R_\circ$ into the monocyclic carbocyclic aryl group Ar substituted by tertiary amino-lower alkyl-oxy, and, if desired, converting a resulting salt into the free compound or into another salt, and/or, if desired, converting a resulting compound into an N-oxide or a quaternary ammonium compound thereof, and/or, if desired, converting a resulting compound or an N-oxide into a salt thereof, and/or, if desired, converting a quaternary ammonium compound into another quaternary ammonium compound, and/or, if desired, separating a mixture of isomers into the single isomers.

In the starting material, the group $Ar_\circ$ may have one or more than one group $R_\circ$, which is converted into tertiary amino-lower alkyl-oxy in one step or in stages. A particularly suitable group $R_\circ$ is hydroxyl; its conversion into tertiary amino-lower alkyl-oxy is carried out according to known procedures. Usually, the starting material, in which $Ar_\circ$ is substituted by hydroxyl representing $R_\circ$, or preferably a salt thereof, is reacted with a reactive ester of a tertiary amino-lower alkanol, in which the tertiary amino group is separated from hydroxyl by at least two carbon atoms, particularly a compound of the formula $AM-(C_mH_{2m})-X$, in which Am and the group of the formula $-(C_mH_{2m})-$ have the previously-given meaning, and X stands for a reactive esterified hydroxyl group. The latter is above all a hydroxyl group esterified with a strong mineral acid, such as a hydrohalic acid, e.g. hydrochloric, hydrobromic acid and the like; the group X represents primarily halogeno, e.g. chloro, bromo and the like. It may also be a hydroxyl group esterified with a strong organic sulfonic acid, such as a lower alkane sulfonic acid, e.g. methane sulfonic, ethane sulfonic acid and the like, or a monocyclic carboxylic aryl-sulfonic acid, e.g. p-toluene sulfonic acid and the like; the group X may, therefore, also stand for lower alkyl-sulfonyloxy, e.g. methyl-sulfonyloxy, ethylsulfonyloxy and the like, or monocyclic carboxylic aryl-sulfonyloxy, e.g. p-tolylsulfonyloxy and the like. The preferred reactive esters of a tertiary amino-lower alkanol are those having the formula $AM-(C_mH_{2m})-Hal$, in which Am and the group of the formula $-(C_mH_{2m})-$ have the previously-given meaning, and Hal represents halogeno, particularly chloro.

As noted above, the starting material is preferably used in the form of a salt thereof. Such salt, for example, a metal salt, particularly an alkali metal salt, e.g. lithium, sodium, potassium and the like, salt, as well as an alkaline earth metal salt, or an other suitable salt, is formed, for example, by treatment of the starting material with a metal salt-forming reagent, such as an alkali metal hydride or an alkali metal amide, e.g. lithium hydride, sodium hydride, sodium amide, potassium amide and the like, or any other suitable reagent, such as an alkali metal lower alkoxide or alkaline earth metal lower alkoxide, e.g. lithium, sodium, potassium or barium methoxide, ethoxide or tertiary butoxide, and the like, an alkali metal compound of a hydrocarbon, e.g. butyl lithium, phenyl lithium, phenyl sodium and the like. The preparation of the salt is usually carried out in the presence of an inert solvent, e.g. hexane, benzene, toluene, xylene, diethyl ether, p-dioxane, tetrahydrofuran, diethyleneglycol dimethylether, N,N-dimethylformamide and the like, or any other suitable solvent, such as a lower alkanol, e.g. methanol, ethanol and the like, or solvent mixture, if necessary, while cooling or at an elevated temperature, and/or in the atmosphere of an inert gas.

The reaction of the starting material, particularly a metal compound thereof, with the reactive ester of a tertiary amino-lower alkanol is carried out in the presence of a suitable diluent, for example, in the solvent or solvent mixture used for the preparation of a metal compound, if necessary, while cooling or at an elevated temperature, and/or, in the atmosphere of an inert gas, e.g. nitrogen. Formation of the metal compound of the starting material may also be achieved in situ; for example, the free starting material and the reactive ester of the tertiary amino-lower alkanol may be reacted in the presence of a salt-forming reagent.

Conversion of hydroxyl representing $R_\circ$ into tertiary amino-lower alkyl-oxy may also be achieved by treating the starting material, in which $Ar_\circ$ is a monocyclic carbocyclic aryl radical substituted by hydroxyl representing $R_\circ$, with a tertiary amino-lower alkanol, in which the tertiary amino group is separated from the hydroxyl group by at least two carbon atoms, in the presence of a di-substituted carbonate. The latter is, for example, a diaryl carbonate, e.g. diphenyl carbonate and the like, or, more particularly, a di-lower alkyl carbonate, e.g. dimethyl carbonate, ethyl methyl carbonate, diethyl carbonate, dibutyl carbonate and the like. The reaction is carried out at an elevated temperature, for example, between about 100° and about 210°, preferably between about 180° and about 200°, and, if desired, in the presence of a transesterification catalyst enhancing the rate of the reaction, e.g. sodium, potassium, sodium carbonate, potassium carbonate, sodium aluminate and the like, a metal lower alkoxide, e.g. sodium ethoxide, titanium butoxide and the like, or any other analogous reagent. The reaction is usually performed in the absence of an additional solvent, an excess of the di-substituted carbonate serving as the diluent, but may also be carried out in the presence of a further solvent or solvent mixture, if necessary, in a closed vessel and/or in the atmosphere of an inert gas, e.g. nitrogen and the like.

Another group $R_\circ$ capable of being converted into tertiary amino-lower alkoxy is the group of the formula $-O-C(=O)-Y$, in which Y represents halogeno or etherified hydroxyl. The group Y is particularly lower alkoxy, e.g. methoxy, ethoxy, n-butyloxy and the like, as well as phenyloxy or any other analogous etherified hydroxyl group, whereas halogeno, representing Y, is particularly chloro, as well as bromo and the like. Upon reacting a starting material having a group $Ar_\circ$ substituted by hydroxyl representing $R_\circ$ with a tertiary amino-lower alkanol, in which tertiary amino is separated from the hydroxyl group by at least two carbon atoms, the desired compound can be formed. The reaction is carried out under the previously-described conditions, i.e. at an elevated temperature, preferably at between 180° and 200°, and, if desired, in the presence of a transesterification reagent, such as one of those previously-described; the reaction is preferably carried out in the absence of a diluent, but may also be performed in the presence of a solvent or solvent mixture, if necessary, in the atmosphere of an inert gas, e.g. nitrogen.

A further group $R_\circ$ capable of being converted into tertiary amino-lower alkoxy is also a reactive esterified hydroxy-lower alkyl-oxy group. The latter is particularly a group of the formula $-O-(C_mH_{2m})-X$, in which X and the group of the formula $-(C_mH_{2m})-$ have the previously-given meanings. The reactive esterified hydroxyl group X is primarily a group Hal representing halogeno, particularly chloro; it may also be a suitable organic sulfonyloxy group, such as one of those mentioned above.

A starting material having a group Ar° substituted by reactive esterified hydroxy-lower alkyl-oxy representing R° is reacted with a secondary amine, having preferably the formula H—Am, in which Am has the above-given meaning, to yield the desired compound. The reaction is preferably carried out in such manner, that an excess of the amine or any other suitable, acid-neutralizing agent, e.g. potassium carbonate and the like, is used. If desired, the reaction mixture is diluted with a suitable inert solvent or solvent mixture; if necessary, the reaction is carried out while cooling or at an elevated temperature, and/or in the atmosphere of an inert gas, e.g. nitrogen, and/or in a closed vessel.

The starting materials used in the above reaction, particularly those in which Ar° is substituted by hydroxyl representing R°, such as those of the previously indicated formula, are new and are intended to be included within the scope of this invention. They are represented, for example, by the formula

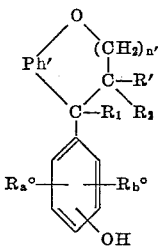

in which Ph′, R′, R₁, R₂ and the letter n′ have the previously given meaning, and each of the groups $R_a°$ and $R_b°$ is hydrogen, halogeno or hydroxyl, whereby the hydroxyl group of the phenyl portion preferably substitutes the 4-position; the preferred group of starting materials are those of the formula

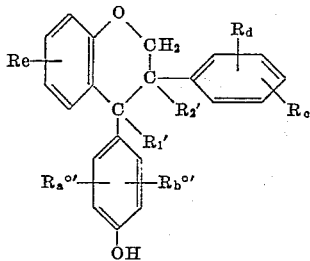

in which $R_1'$, $R_2'$, $R_c$, $R_d$ and $R_e$ have the previously given meaning, and each of the groups $R_a°''$ and $R_b°''$ is hydrogen or hydroxyl.

The above starting materials are prepared according to known methods. Thus, starting materials, in which Ar° is substituted by hydroxyl representing R°, may be prepared, for example, by reacting a compound having one of the formulae:

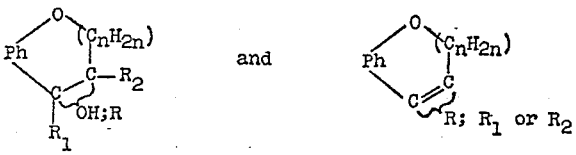

in which Ph, R, R₁, R₂ and the letter n have the previously-given meaning, with a compound of the formula H—Ar°, in which Ar° has the previously-given meaning, but is preferably a monocyclic carbocyclic aryl radical substituted by hydroxyl, in the presence of a suitable Lewis acid reagent, such as a strong inorganic acid, e.g. sulfuric acid and the like, or a Friedel-Crafts reagent, e.g. aluminum chloride and the like; this reaction is carried out according to known procedures.

The starting material, in which Ar° is a monocyclic carbocyclic aryl radical substituted by hydroxyl, is also obtained, for example, by reacting a compound of the formula

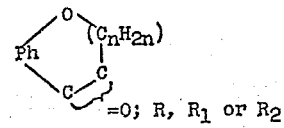

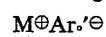

in which Ph, R, R₁, R₂ and the letter n have the previously given meaning, with a reagent of the formula $$M^{\oplus} Ar_°'^{\ominus}$$

in which Ar°′ is a monocyclic carbocyclic aryl radical substituted by R°′ capable of being converted into hydroxyl (particularly lower alkoxy, e.g. methoxy, ethoxy and the like, as well as a benzyloxy group, e.g. benzyloxy, 1-phenylethyloxy and the like), and $M^{\oplus}$ is the cation of certain metals of the IA-group of the Periodic System (i.e. of certain alkali metals), e.g. lithium, sodium and the like, or the group of the formula Hal—Mg⊕, in which Hal is halogeno, e.g. chloro, bromo, iodo, and the like. In a compound resulting from such procedure and having the formula

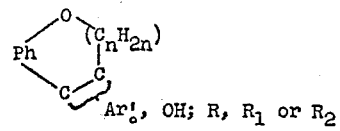

in which Ph, Ar°′, R, R₁, R₂ and the letter n have the previously-given meaning, whereby Ar°′ and the hydroxyl group substitute the same carbon atom, the hydroxyl group may be replaced by hydrogen, for example, by hydrogenolysis (e.g. by hydrogenation in the presence of a suitable catalyst), or by its conversion into an esterified hydroxyl group, such as acyloxy (for example, by treatment with a suitable halogenating reagent), and removal of the esterified hydroxyl group (using, for example, reductive procedures). In a resulting compound R°′ substituting Ar°′ is converted into hydroxyl (for example, by acid hydrolysis with an aqueous hydrohalic acid, e.g. hydrobromic acid and the like, by hydrogenolysis with hydrogen in the presence of a suitable catalyst, e.g. a palladium catalyst, or any other appropriate procedure).

Furthermore, in a starting material, in which Ar° is substituted by hydroxyl, the latter may be converted into the group —O—C(=O)—Y, in which Y has the previously-given meaning, for example, according to any method suitable for the esterification of a phenolic hydroxyl group, such as formation of an alkali metal compound of the phenolic intermediate and reaction of the latter with an ester of the acid of the formula $$HO—C(=O)—Y$$

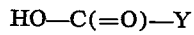

or the halide thereof.

In addition, the R° substituting Ar° in a resulting starting material, whenever representing hydroxyl, may be converted into a reactive esterified hydroxyl-lower alkyl-oxy group by treating the starting material having such free hydroxyl group or a salt thereof with a lower alkylene-oxide, a halogeno-lower alkanol, in which halogeno is separated from hydroxyl by at least two carbon atoms, or with a lower alkylene halide, in which the two halogeno atoms are separated by at least two carbon atoms, for example, a chloro-lower alkyl bromide, in which chloro is separated from bromo by at least two carbon atoms, and, if necessary, converting in a resulting compound, in which Ar° is substituted by hydroxy-lower alkyl-oxy, hydroxyl into esterified hydroxyl according to known methods, for example, by treatment with a thionyl halide, e.g. thionyl chloride and the like, a phosphorus halide, e.g. phosphorus tribromide and the like, or with an organic sulfonic acid halide, e.g. chloride and the like, or any other suitable method.

The compounds of this invention are also prepared, for example, by replacing in a compound of the formula

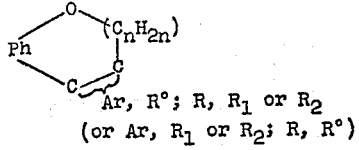

in which Ph, Ar, R, $R_1$, $R_2$ and the letter $n$ have the previously-given meaning, and R° is hydroxyl or esterified hydroxyl, or a salt thereof, the group R° by hydrogen, and, if desired, carrying out the optional steps.

A hydroxyl group representing R° in the above starting material is preferably attached to the same carbon atom as the group Ar, especially, if the latter substitutes one of the carbon atoms adjacent to the 1,2-phenylene radical; it may also be attached to the carbon atom carrying the group R. It is replaced according to known methods, for example, by treating the starting material or an acid addition salt thereof with hydrogen in the presence of a catalyst, e.g., a platinum catalyst (for example, in the presence of methanol), Raney nickel and the like, if necessary, at an increased pressure and/or at an elevated temperature. It may also by removed by chemical reduction, for example, by treatment with zinc in the presence of an acid, e.g. hydrochloric acid, acetic acid and the like, with a metal amalgam, e.g. sodium amalgam and the like, in the presence of a moist solvent, e.g. diethyl ether and the like, with a light metal hydride, e.g. lithium aluminum hydride in the presence of aluminum chloride and the like, or any other suitable method.

An esterified hydroxyl group representing R° is primarily halogeno (i.e. hydroxyl esterified with a hydrohalic acid), e.g. chloro, bromo and the like. It is removed either by catalytic hydrogenation or by chemical reduction, e.g. by treatment with zinc in the presence of an acid.

The starting materials used in the above reaction are prepared according to known methods, for example, by reacting a compound of the formula

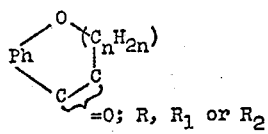

in which Ph, R, $R_1$, $R_2$ and the letter $n$ have the previously-given meaning, with a Grignard reagent of the formula HalMg⊕[Ar]⊖, in which Ar has the previously-given meaning, and Hal is halogeno, e.g. chloro, bromo and the like, and carefully decomposing a resulting organo-metallic complex. It may also be prepared obtained, for example, by reacting a compound of the formula

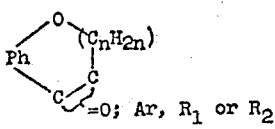

in which Ph, Ar, $R_1$, $R_2$ and the letter $n$ have the previously-given meaning, with a reagent of the formula HalMg⊕[R]⊖, in which R and Hal have the previously-given meaning.

The above reactions are carried out according to known methods. If necessary, a Grignard reagent is prepared, for example, according to the "Method of Entrainment," described by Kharash and Reinmuth, Grignard Reactions of Non-metallic Substances (Prentice-Hall, 1954), and the reaction may have to be performed in a cyclic reactor, as described, for example, by Lawesson, Acta Chem. Scand., vol. 12, p. 1 (1958).

In a resulting starting material, the hydroxyl group may be converted into an esterified hydroxyl group, for example, into halogeno (for example, by treatment with a thionyl halide, e.g. thionyl chloride and the like, or a phosphorus halide, e.g. phosphorus bromide and the like).

The intermediates used in the above described Grignard reaction for the preparation of the starting materials are known or may be prepared according to known methods.

Compounds of this invention may also be prepared by converting in a compound of the formula

in which Ph, Ar, R and the letter $n$ have the previously-given meaning, or a salt thereof, the carbon-to-carbon double bond, the carbon atoms of which are substituted by Ar and R, into a carbon-to-carbon single bond, the carbon atoms of which are substituted by Ar and R, and, if desired, carrying out the optional steps. The removal of the carbon-to-carbon double bond is carried out according to methods known per se, for example, by treatment with an alkali metal, e.g. sodium and the like, in the presence of a lower alkanol, with metal amalgam in the presence of a hydrogen donor, e.g. sodium amalgam in the presence of moist diethyl ether, catalytically activated hydrogen, such as hydrogen in the presence of a platinum catalyst and the like, or any other suitable method, such as those mentioned above.

The starting materials used in the above reaction are prepared, for example, according to the procedure described in our copending application Ser. No. 356,664, filed Apr. 1, 1964.

A resulting salt is converted into the free base, for example, by treating it with an alkaline reagent, such as a metal hydroxide, e.g. lithium hydroxide, sodium hydroxide, potassium hydroxide, calcium hydroxide and the like, a metal carbonate, e.g. sodium, potassium or calcium carbonate or hydrogen carbonate and the like, ammonia and the like, or by treatment with a suitable hydroxyl ion exchange resin.

A resulting salt, particularly a salt with an inorganic acid, can be converted into another salt according to known methods, for example, by reacting it with a suitable metal e.g. sodium, barium, silver and the like, salt of an acid, preferably in the presence of a diluent, in which a resulting inorganic salt is insoluble and is thus removed from the reaction. A salt may also be converted into another salt by treating it with an anion exchange preparation.

A free base is converted into an acid addition salt thereof according to known methods, for example, by reacting it or a solution thereof in a suitable solvent or solvent mixture with the acid or a solution thereof, or with a suitable anion exchange preparation, and isolating the desired salt. A salt may be obtained in the form of a hydrate thereof or may include solvent of crystallization.

The N-oxide of a compound of this invention is prepared according to known methods, for example, by treating the free base with a suitable N-oxidizing reagent, such as hydrogen peroxide, ozone or a peracid, e.g. peracetic, perbenzoic, monoperphthalic, persulfuric acid and the like, in the presence of a suitable inert diluent. An N-oxide is converted into an acid addition salt thereof according to the above procedure.

Quaternary ammonium derivatives of the compounds of this invention are obtained according to known methods, for example, by reacting the base with the reactive ester of an alcohol and a strong acid, such as, for example, with one of the lower alkyl halides, di-lower alkyl sulfates, lower alkyl organic sulfonates, phenyl-lower alkyl halides described above. The quaternizing reaction is performed in the absence or presence of a solvent, while cooling or at an elevated temperature, if necessary, in a closed vessel and/or in the atmosphere of an inert gas, e.g. nitrogen and the like.

Resulting quaternary ammonium compounds may be converted into other quaternary ammonium compounds, such as the quaternary ammonium hydroxides, for example, by reacting a quaternary ammonium halide with silver oxide, or a quaternary ammonium sulfate with barium hydroxide, by treating a quaternary ammonium salt with a hydroxyl ion exchange preparation or any other suitable method. A quaternary ammonium hydroxide is converted into a quaternary ammonium salt by reacting the former with a suitable acid. A quaternary ammonium salt is also converted directly into another quaternary ammonium salt; for example, a quaternary ammonium iodide, when reacted with freshly prepared silver chloride or with hydrochloric acid in anhydrous methanol, yields the desired quaternary ammonium chloride, or a quaternary ammonium salt when treated with a suitable anion exchange preparation, can be converted into another quaternary ammonium salt when treated with a suitable anion exchange preparation, can be converted into another quaternary ammonium salt. A quaternary ammonuim compound may be obtained in the form of a hydrate thereof or may contain solvent of crystallization.

A mixture of resulting isomeric compounds may be separated into the single isomers. For example, a mixture of diastereo-isomers or a mixture of geometric cis-trans isomers is separated into the individual racemic compounds on the basis of physico-chemical differences, such as solubility, for example, by fractional crystallization, as well as by fractional distillation and the like. Racemates are resolved into the optically active d- and l-forms according to known resolution procedures, for example, by forming a salt of the free racemic base with one of the optically active forms of an acid containing an asymmetric carbon atom. Especially useful as optically active forms of salt-forming acids having an asymmetric carbon atom are D-tartaric (l-tartaric) and L-tartaric (d-tartaric) acid, as well as the optically active forms of malic, mandelic, camphor 10-sulfonic, quinic acid and the like. A resulting mixture of salts of the optically active acid with the antipodes of the base racemate is separated into the single salts on the basis of physico-chemical differences, for example, by fractional crystallization. From a resulting salt, the free and optically active base is obtained according to the method described above, and a free and optically active base can be converted into its acid addition salt, N-oxide, salt of an N-oxide or quaternary ammonium compound according to the procedures described above.

The invention also comprises any modification of the process wherein a compound formed as an intermediate at any stage of the process, is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitation thereon. Temperatures are given in degrees centigrade.

*Example 1*

To a cold solution of 4-(4-hydroxy-phenyl)-3-phenyl-chromane in 15 ml. of N,N-dimethylformamide and 15 ml. of toluene is added 0.2 g. of a 53 percent suspension of sodium hydride in mineral oil, and then 0.84 g. of 2-N,N-diethylaminoethyl chloride in 5 ml. of toluene while stirring. After stirring overnight, the reaction mixture is filtered and the solvent is removed under reduced pressure. The residue is taken up in water, the organic material is extracted with diethyl ether, and the organic solution is washed with 3 N aqueous hydrochloric acid. The acidic washings are made basic with a 10 percent solution of sodium hydroxide in water, and the desired 4 - [4 - (2 - N,N - diethylaminoethyl) - oxy - phenyl]-3-phenyl-chroman of the formula

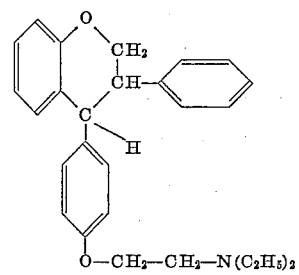

is extracted with diethyl ether and obtained after removing the solvent; yield: 1.5 g. It is purified by distillation, B.P. 123–130°/1.0 mm., and analyzes as follows:

Calcd. for $C_{27}H_{31}NO_2$: C, 80.76; H, 7.78; N, 3.49. Found: C, 80.98; H, 7.98; N, 3.40.

The starting material used in the above procedure is prepared as follows: To 100.0 g. of phenol is added dropwise and while stirring, 169.0 g. of phenylacetyl chloride. During the addition, gaseous hydrogen chloride evolves; the reaction mixture is stirred for two hours and refluxed on the steam bath for one hour. The cold solution is poured onto ice; the aqueous mixture is extracted with diethyl ether, and the organic extract is washed with a saturated aqueous solution of sodium hydrogen carbonate and dried. The solvent is removed to yield 223.0 g. of the oily phenyl benzoate which crystallizes on standing, M.P. 39–41°.

To 223.0 g. of phenyl benzoate is added 160.0 g. of anhydrous aluminum chloride and the reaction mixture is heated on the oil bath to 170° for thirty minutes. The cold reaction mixture is taken up in boiling water and extracted with diethyl ether. After drying, the organic solution is evaporated and the residue is distilled to yield 42.4 g. of 2-hydroxy-benzophenone, which is collected at 145–163°/0.4–0.1 mm., and solidifies, M.P. 53–54° after recrystallization from a mixture of petroleum ether and diethyl ether.

A mixture of 10.0 g. of 2-hydroxy-benzophenone, 125 ml. of pyridine, 5 ml. of piperidine and 95 ml. of ethyl orthoformate is refluxed for eight hours. The solvent is removed and the residue is recrystallized from ethanol to yield 6.2 g. of 3-phenyl-4H-chromen-4-one, which melts at 131–133°.

A total of 17.6 g. of 3-phenyl-4H-chromen-4-one is dissolved in 800 ml. of hot ethanol, and the solution is treated with 9.1 g. of sodium borohydride while stirring. After refluxing for one hour, the solvent is removed, water is added to the residue, and the 3-phenyl-chroman-4-ol is extracted with diethyl ether; it is purified by distillation and collected at 130–160°/1 mm.; yield: 15.8 g.

A solution of 14.8 g. of 3-phenyl-chroman-4-ol and 5.7 g. of phenol in 78 ml. of hexane and 78 ml. of benzene is added dropwise to a cooled mixture of 4.4 g. of anhydrous aluminum chloride and 12.2 g. of phenol. The reaction mixture is stirred at room temperature overnight and is then poured into a mixture of concentrated hydrochloric acid and ice. The organic material is extracted with diethyl ether; the organic solution is washed with water and a saturated aqueous solution of sodium chloride, dried and evaporated. The resulting 4-(4-hydroxyphenyl)-3-phenyl-chroman of the formula

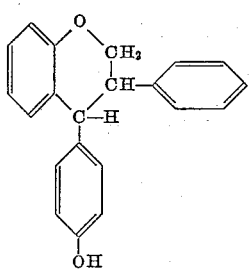

is purified by distillation and collected at 120–145°/20 mm.; yield: 16.0 g. It crystallizes, M.P. 63°, and analyzes as follows:

Calcd. for $C_{21}H_{28}O_2$: C. 83.42; H, 6.00. Found: C, 83.57; H, 5.97.

*Example 2*

To a cold solution of 4.0 g. of 4-(4-hydroxy-phenyl)-3-phenyl-chroman in 30 ml. of N,N-dimethylformamide and 30 ml. of toluene is added 0.7 g. of a 53 percent suspension of sodium hydride, and then 1.7 g. of 1-(2-chloroethyl)-pyrrolidine in 10 ml. of toluene while stirring. After stirring overnight, the reaction mixture is filtered and the solvent is removed under reduced pressure. The residue is taken up in water, the organic material is extracted with diethyl ether, and the organic solution is washed with 3 N aqueous hydrochloric acid. The acidic washings are made basic with a 10 percent solution of sodium hydroxide in water, and the desired 3-phenyl-4-{4-[2-(1-pyrrolidino)-ethyl]-oxy-phenyl}-chroman of the formula

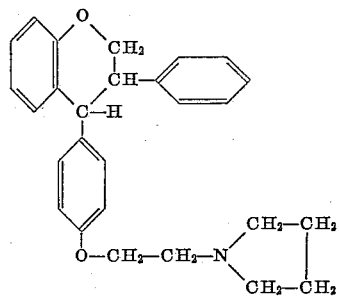

is extracted with diethyl ether and obtained after removing the solvent; yield: 3.2 g. It is purified by distillation and collected at 140–150°/0.6 mm.; it analyzes as follows:

Calcd. for $C_{27}H_{29}NO_2$: C, 81.17; H, 7.32. Found: C, 81.04; H, 6.90.

Upon treatment of a solution of the above 3-phenyl-4-{2-(1-pyrrolidino)-ether]-oxy-phenyl}-chroman with hydrogen chloride, maleic acid or picric acid, the 3-phenyl-4-{4-[2-(1 - pyrrolidino)-ethyl]-oxy-phenyl}chroman hydrochloride, 3-phenyl-4-{4-[2-(1-pyrrolidino)-ethyl]-oxy-phenyl}-chroman maleate, and 3-phenyl-4-{4-[2-(1-pyrrolidino)-ethyl]-oxy - phenyl} - chroman picrate, respectively, is formed.

The reaction of 3-phenyl-4-{4-[2-1-pyrrolidino)-ethyl]-oxy-phenyl}-chroman with an excess of methyl iodide yields the 3-phenyl-4-{4-[2-(1-pyrrolidino)-ethyl]-oxy-phenyl}-chroman methiodide, whereas treatment of 3-phenyl - 4-{4 - [2 - (1-pyrrolidino)-ethyl]-oxy-phenyl}-chroman with hydrogen peroxide affords the formation of the 3-phenyl - 4 - {4 - [2-(1-pyrrolidino)-ethyl]-oxy-phenyl}-chroman N-oxide, which is characterized as the picrate salt of 3-phenyl-4-{4-[2-(1-pyrrolidino)-ethyl]-oxy-phenyl}-chroman N-oxide by treatment with picric acid.

*Example 3*

To a cooled solution of 1.4 g. of 4-(4-hydroxy-phenyl)-7-methoxy-3-phenyl-chroman in 25 ml. of a 1:1-mixture of N,N-dimethylformamide and toluene is added 0.24 g. of a 53 percent suspension of sodium hydride in mineral oil. After stirring, the reaction mixture is treated with a solution of 0.6 g. of 1-(2-chloroethyl)-pyrrolidine in 5 ml. of toluene, and stirring at room temperature is continued for an additional twenty hours. The inorganic precipitate is filtered off and washed with diethyl ether; the organic filtrate is concentrated under reduced pressure and the residue is taken up into water. The organic material is extracted with diethyl ether, and the organic extract is washed with 2 N hydrochloric acid. The acidic washings are made alkaline with concentrated aqueous sodium hydroxide and are extracted with diethyl ether. The organic extracts are combined, dried and evaporated to yield 1.3 g. of the oily 7-methoxy-3-phenyl-4-{4-[2-(1-pyrrolidino)-ethyl]-oxy-phenyl}-chroman of the formula

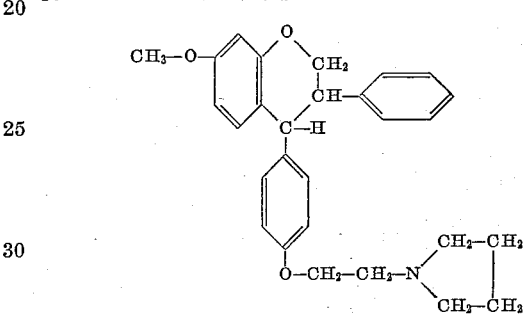

which is purified by distillation and collected at 120–140°/3 mm.

The starting material used in the above procedure is prepared as follows: A solution of 90.0 g. of 3-methoxy-phenol in 100 ml. of water containing 20.0 g. of sodium hydroxide is added to 100.0 g. of α-bromo-acetophenone in 120 ml. of acetone. After heating on the steam bath for fifteen minutes, the acetone is removed under reduced pressure, and the resulting aqueous solution is poured onto ice while stirring. An oil separates, which crystallizes; the desired 3-methoxy-phenyl benzoate is filtered off and recrystallized from ethanol, M.P. 85–87°; yield: 86.0 g.

A mixture, prepared from 86.0 g. of 3-methoxy-phenyl benzoate, 1,000 ml. of diethyl ether, 112.0 g. of potassium cyanide and 500 ml. of water, is stirred while adding 200 ml. of 30 percent sulfuric acid; approximately 2 ml. of the acid is added every thirty minutes for three hours, then dropwise. After stirring for five hours, the organic layer is separated and the aqueous phase is washed with diethyl ether; the combined organic extracts are washed with water, dried and evaporated. The desired 2-hydroxy-3-phenyl-3-(3-methoxy-phenyl)-oxy-propionitrile crystallizes on standing under reduced pressure, M.P. 86–87°; yield: 93.0 g.

To a solution of 23.0 g. of 2-hydroxy-2-phenyl-3-(3-methoxy-phenyl)-oxy-propionitrile in 400 ml. of diethyl ether is added 12.0 g. of powdered anhydrous zinc chloride, and anhydrous hydrogen chloride is bubbled through the reaction mixture for two hours. After standing in the refrigerator for three days, it is heated with ice and water and is then treated on the steam bath. The solid material is filtered off and crystallized from ethyl acetate to yield 3-hydroxy-7-methoxy-3-phenyl-chroman-4-one, which melts at 133–135°; yield: 8.3 g.

A mixture of 8.3 g. of 3-hydroxy-7-methoxy-3-phenyl-chroman-4-one, 25 ml. of pyridine and 25 ml. of acetic anhydride is heated at 100–115° for three hours, and is then treated with ice and water. The gummy material is filtered off and crystallized from ethanol to yield 8.5 g. of 3-acetyloxy-7-methoxy-3-phenyl-chroman-4-one, which melts at 104–106°.

A solution of 8.7 g. of 3-acetyloxy-7-methoxy-3-phenyl-chroman-4-one in 200 ml. of 70 percent aqueous acetic acid is heated to 100°, and treated with 13.1 g. of zinc dust, which is added over a period of five minutes while stirring. After maintaining the reaction mixture at 100° for fifty minutes, it is filtered and diluted with water. The organic precipitate is filtered off and crystallized from ethanol to yield 5.3 g. of 7-methoxy-3-phenyl-chroman-4-one, M.P. 78–85°.

To 4.0 g. of 7-methoxy-3-phenyl-chroman-4-one in 100 ml. of tetrahydrofuran is added 1.2 g. of lithium aluminum hydride, and the reaction mixture is refluxed for five hours. The excess of reducing reagent is decomposed with water, and the solvent is removed. An additional quantity of water is added, and the organic material is extracted with diethyl ether. The organic solution is dried and evaporated to yield the 7-methoxy-3-phenyl-chroman-4-ol, which melts at 135–137°.

To a mixture of 0.4 g. of anhydrous aluminum chloride and 0.5 g. of phenol is added while cooling and stirring, a solution of 1.6 g. of 7-methoxy-3-phenyl-chroman-4-ol and 1.1 g. of phenol in 25 ml. of a 1:1-mixture of benzene and hexane; the reaction mixture turns red while evolving hydrogen chloride. The ice-bath is removed, and after standing overnight, the reaction mixture is poured onto ice and concentrated hydrochloric acid. The gummy residue is taken up in diethyl ether, and the aqueous layer is washed with ether. The organic solutions are combined, washed with water and a saturated aqueous solution of sodium chloride, and dried. Upon removal of the solvent, 5.5 g. of the desired 4-(4-hydroxy-phenyl)-7-methoxy-3-phenyl-chroman of the formula

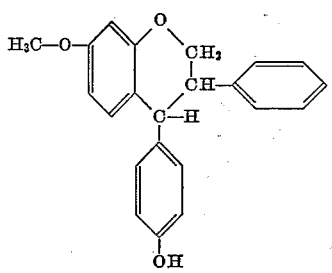

is obtained, which melts at 180–184° after recrystallization from benzene, and analyzes as follows:

Calcd. for $C_{22}H_{20}O_3$: C, 79.49; H, 6.06. Found: C, 79.84; H, 6.11.

*Example 4*

Other compounds, which are prepared according to the above procedure by selecting the appropriate starting materials are, for example, 3-[4-(2-N,N-diethylaminoethyl)-oxy-phenyl] - 6 - methoxy-2-phenyl-2,3-dihydro-benzofuran, prepared by reacting 6-methoxy-2-phenyl-2,3-dihydro-benzofuran-3-ol with phenol in the presence of aluminum chloride, and treating the sodium salt of the resulting 3-(4-hydroxy-phenyl)-6-methoxy-2-phenyl-2,3-dihydro - benzofuran with 2-N,N-diethylaminoethyl chloride;

6-methoxy - 2 - phenyl-3-{4-[2-(1 - pyrrolidino) - ethyl]-oxy-phenyl}-2,3-dihydro-benzofuran, prepared by reacting the sodium salt of 3-(4-hydroxy-phenyl)-6-methoxy-2-phenyl-2,3-dihydro-benzofuran with 1-(2-chloroethyl)-pyrrolidine;

3-(4-methyl-phenyl)-4-{4-[2-(1-piperidino) - ethyl] - oxy-phenyl}-chroman, prepared by reacting 3-(4-methyl-phenyl)-chroman-4-ol with phenol in the presence of aluminum chloride, and treating the sodium salt of the resulting 4-(4-hydroxy-phenyl)-3-(4 - methyl - phenyl)-chroman with 1-(2-chloroethyl)-piperidine;

3-(4-methoxy - phenyl)-4-[4-(2-N,N - dimethylaminoethyl)-oxy-phenyl]-chroman, prepared by reacting 3-(4-methoxy-phenyl)-chroman-4-ol with phenol in the presence of aluminum chloride, and treating the sodium salt of the resulting 4-(4 - hydroxy-phenyl)-3-(4-methoxy-phenyl)-chroman with 2-N,N-dimethylaminoethyl chloride;

3-(4-chloro-phenyl) - 4 - [4-(2-N,N-diethylaminoethyl)-oxy-phenyl]-chroman, prepared by reacting 3-(4-chloro-phenyl)-chroman-4-ol with phenol in the presence of aluminum chloride, and treating the sodium salt of the resulting 3-(4-chloro-phenyl)-4-(4-hydroxy - phenyl)-chroman with 2-N,N-diethylaminoethyl chloride;

3-(4-chloro-phenyl)-4-{4-[2-(1-pyrrolidino) - ethyl]-oxy-phenyl}-chroman, prepared by reacting the sodium salt of 3-(4-chloro-phenyl)-4-(4-hydroxy-phenyl)-chroman with 1-(2-chloroethyl)-pyrrolidine;

3-(4-chloro-phenyl) - 4 - [2,3,4-tri-(2-N,N-diethylaminoethyl)-oxy-phenyl]-chroman, prepared by reacting 3-(4-chloro-phenyl)-chroman-4-ol with pyrogallol in the presence of concentrated sulfuric acid and reacting the sodium salt of the resulting 3-(4-chloro-phenyl)-4-(2,3,4-trihydroxy - phenyl) - chroman with 2-N,N-diethylaminoethyl chloride;

4-methyl-4-{4-[2-(4-morpholino)-ethyl] - oxy - phenyl}-3-phenyl-chroman, prepared by reacting 3-phenyl-chroman-4-one with methyl magnesium iodide, treating the resulting 4-methyl-3-phenyl-chroman-4-ol with phenol in the presence of aluminum chloride, and reacting the sodium salt of 4-(4-hydroxy-phenyl)-4-methyl-3-phenyl-chroman with 4-(2-chloroethyl)-morpholine;

4-[4-(2-N,N-diethylaminoethyl)-oxy-phenyl] - 7 - methoxy-3-phenyl-chroman, prepared by reacting 7-methoxy-3-phenyl-chroman-4-ol with phenol in the presence of aluminum chloride and treating the sodium salt of the resulting 4-(4-hydroxy-phenyl) - 7 - methoxy-3-phenyl-chroman with 2-N,N-diethylaminoethyl chloride;

7-chloro - 4 - [3-chloro-4-(2-N,N-diethylaminoethyl)-oxy-phenyl]-3-phenyl-chroman, prepared by reacting 7-chloro-3-phenyl-chroman-4-ol with o-chloro-phenol in the presence of aluminum chloride, and treating the sodium salt of the resulting 7-chloro-4-(3-chloro-4-hydroxy-phenyl)-3-phenyl-chroman with 2-N,N-diethylaminoethyl chloride;

5,7-dimethoxy-4-{4-[2-(4-methyl - 1 - piperazino)-ethyl]-oxy-phenyl}-3-phenyl-chroman, prepared by reacting 5,7-dimethoxy-3-phenyl-chroman-4-ol with phenol in the presence of aluminum chloride, and treating the sodium salt of the resulting 5,7-dimethoxy-4-(4-hydroxy-phenyl)-3-phenyl-chroman with 1-(2-chloro-ethyl)-4-methyl-piperazine;

4-[4-(3-N,N-dimethylaminopropyl) - oxy - phenyl]-7-methyl-3-(3-pyridyl)-chroman, prepared by reacting 7-methyl-3-(3-pyridyl)-chroman-4-ol with phenol in the presence of aluminum chloride, and treating the sodium salt of the resulting 4-(4-hydroxy-phenyl)-7-methyl-3-(3-pyridyl)-chroman with 3-N,N-dimethylaminopropyl chloride;

3-[4-(2-N,N-diethylaminoethyl)-oxy - phenyl]-4-phenyl-chroman, prepared by reacting 3-(4-methoxy-phenyl)-4-phenyl-chroman with pyridine hydrochloride, and treating the sodium salt of 3-(4-hydroxy-phenyl)-4-phenyl-chroman with 2-N,N-diethylaminoethyl chloride;

5-[4-(2-N,N-diethylaminoethyl)-oxy-phenyl] - 4 - phenyl-2,3,4,5-tetrahydro-1-benzoepin, prepared by reacting 4-phenyl-2,3,4,5-tetrahydro-1-benzoxepin-5-ol with phenol in the presence of aluminum chloride, and treating the sodium salt of the resulting 5-(4-hydroxy-phenyl)-4-phenyl-2,3,4,5-tetrahydro-1-benzoxepin with 2-N,N-diethylaminoethylchloride, and the like.

What is claimed is:

1. A member selected from the group consisting of the compound of the formula

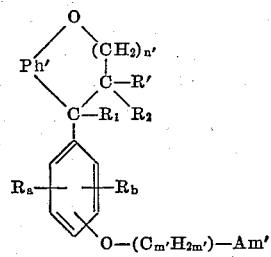

in which Ph' is a member selected from the group consisting of 1,2-phenylene, (lower alkyl)-1,2-phenylene, (lower alkoxy)-1,2-phenylene and (halogeno)-1,2-phenylene, R' is a member selected from the group consisting of phenyl, (lower alkyl)-phenyl, (lower alkoxy)-phenyl and (halogeno)-phenyl, each of the groups $R_1$ and $R_2$ is a member selected from the group consisting of hydrogen and lower alkyl, the letter $n'$ stands for an integer from 0 to 2, Am' is a member selected from the group consisting of N,N-di-lower alkylamino, N,N-alkylene-imino, in which alkylene has from four to seven carbon atoms, 4-morpholino and 4-lower alkyl-1-piperazino, the group of the formula —$(C_{m'}H_{2m'})$— stands for alkylene having from two to three carbon atoms, and separates the group Am' from the oxygen by two to three carbon atoms, and each of the groups $R_a$ and $R_b$ is a member selected from the group consisting of hydrogen, halogeno and the group of the formula —O—$(C_{m'}H_{2m'})$—Am', in which Am' and the group of the formula —$(C_{m'}H_{2m'})$— have the previously given meaning, and a pharmaceutically acceptable acid addition salt thereof.

2. A member selected from the group consisting of the compound of the formula

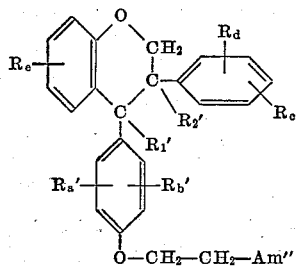

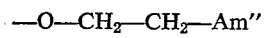

in which Am'' is a member selected from the group consisting of N,N-di-lower alkyl-amino and N,N,-alkylene-imino, in which alkylene has from four to seven carbon atoms, one of the groups $R_1'$ and $R_2'$ is a member selected from the group consisting of hydrogen and lower alkyl, and the other is hydrogen, each of the groups $R_a'$ and $R_b'$ is a member selected from the group consisting of hydrogen and the group of the formula —O—$CH_2$—$CH_2$—Am'' in which Am'' has the previously given meaning, and each of the groups $R_c$, $R_d$ and $R_e$ is a member selected from the group consisting of hydrogen, lower alkyl, lower alkoxy and halogeno, and a pharmaceutically acceptable acid addition salt thereof.

3. A member selected from the group consisting of the 4-[4-(2 - N,N-diethylaminoethyl)-oxy-phenyl]-3-phenyl-chroman, and a pharmaceutically acceptable acid addition salt thereof.

4. A member selected from the group consisting of the 3-phenyl - 4 - {4-[2-(1 - pyrrolidino)-ethyl]-oxy-phenyl}-chroman, and a pharmaceutically acceptable acid addition salt thereof.

5. A member selected from the group consisting of the 7-methoxy-3-phenyl-4-{4-[2-(1 - pyrrolidino)-ethyl]-oxy-phenyl}-chroman, and a pharmaceutically acceptable acid addition salt thereof.

6. A compound of the formula

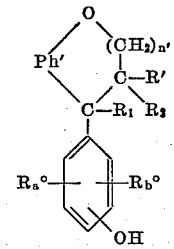

in which Ph' is a member selected from the group consisting of 1,2-phenylene, (lower alkyl)-1,2-phenylene, (lower alkoxy)-1,2-phenylene, and (halogeno)-1,2-phenylene, R' is a member selected from the group consisting of phenyl, (lower alkyl)-phenyl, (lower alkoxy)-phenyl and (halogeno)-phenyl, each of the groups $R_1$ and $R_2$ is a member selected from the group consisting of hydrogen and lower alkyl, the letter $n'$ stands for an integer from 0 to 2, and each of the groups $R_a°$ and $R_b°$ is a member selected from the group consisting of hydrogen, halogeno and hydroxyl.

7. A compound of the formula

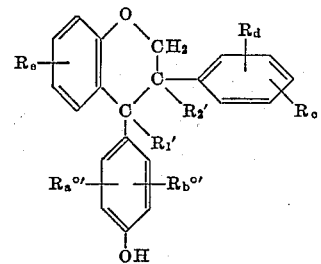

in which one of the groups $R_1'$ and $R_2'$ is a member selected from the group consisting of hydrogen and lower alkyl, and the other is hydrogen, each of the groups $R_a°''$ and $R_b°''$ is a member selected from the group consisting of hydrogen and hydroxyl, and each of the groups $R_c$, $R_d$ and $R_e$ is a member selected from the group consisting of hydrogen, lower alkyl, lower alkoxy and halogeno.

8. 4-(4-hydroxy-phenyl)-3-phenyl-chroman.
9. 4-(4-hydroxy-phenyl)-7-methoxy-3-phenyl-chroman.

References Cited

UNITED STATES PATENTS 2,636,885  4/1953  Wynn et al. _____ 260—346.2
3,142,682  7/1964  De Stevens _____ 260—345.2 XR

OTHER REFERENCES

Lowenbein et al.: Chemical Abstracts, vol. 19, pages 286–8 (1952), QD 1. A51.

Maitte: Chemical Abstracts, vol. 49, columns 6929–31 (1955), QD 1. A51.

WALTER A. MODANCE, *Primary Examiner.*

J. M. FORD, *Assistant Examiner.*